United States Patent [19]
Murray

[11] 3,751,712
[45] Aug. 7, 1973

[54] DIGITAL DIFFERENTIAL ANALYZER SPIRAL SCAN GENERATOR

[75] Inventor: Gordon E. Murray, Santa Ana, Calif.
[73] Assignee: Hughes Aircraft Company, Culver City, Calif.
[22] Filed: Apr. 29, 1970
[21] Appl. No.: 32,951

[52] U.S. Cl. .............................. 315/24, 343/5 DP
[51] Int. Cl. ............................................ H01j 29/70
[58] Field of Search .............. 343/5 DP; 315/24, 315/23, 22, 19, 18

[56] References Cited
UNITED STATES PATENTS
| | | | |
|---|---|---|---|
| 3,392,305 | * 7/1968 | Anderson et al. | 315/24 |
| 3,292,034 | 12/1966 | Braaten | 315/24 |
| 3,431,459 | 3/1969 | Freeborn | 315/24 |
| 3,478,357 | 11/1969 | Bacon | 315/24 |

*Primary Examiner*—Carl D. Quarforth
*Assistant Examiner*—J. M. Potenza
*Attorney*—James K. Haskell and Walter J. Adam

[57] ABSTRACT

A spiral sweep generator for a rectangular Cartesian coordinate PPI display in a sonar system is disclosed using two cross-coupled DDA's to generate the sine and cosine values of sweep angle $\theta$, and DDA's coupled to the sine and cosine DDA's to compute range rate values as increments $\Delta x$ and $\Delta y$. The signs of the sine and cosine values are computed from the range rate increments as absolute values by counters in a PPI display unit. The signs of the sine and cosine are applied directly to the respective derivatives $X$ and $Y$ in the display unit where $\theta$ is zero for a heading-up display, i.e., for $X=0$; $Y=1$.

16 Claims, 10 Drawing Figures

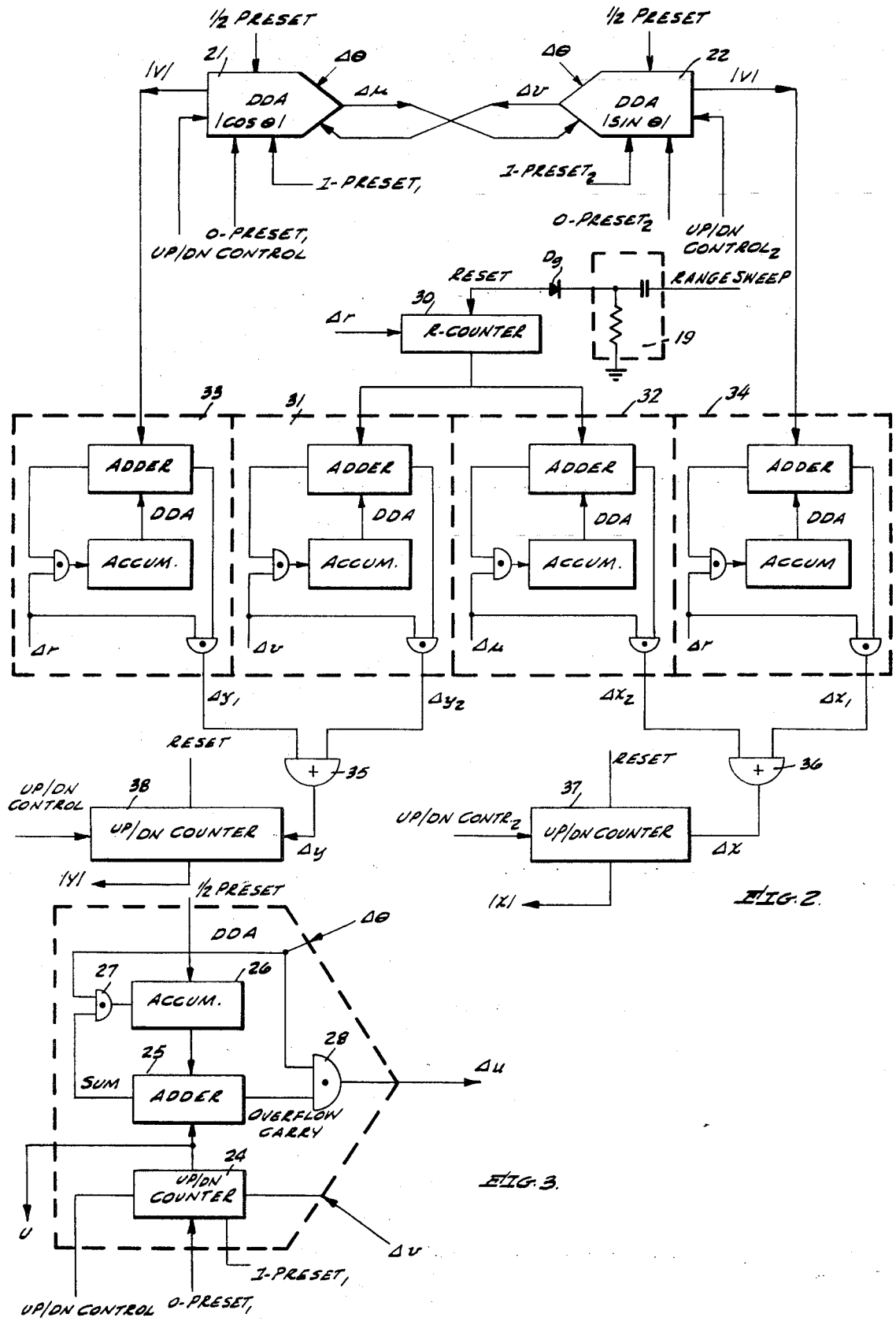

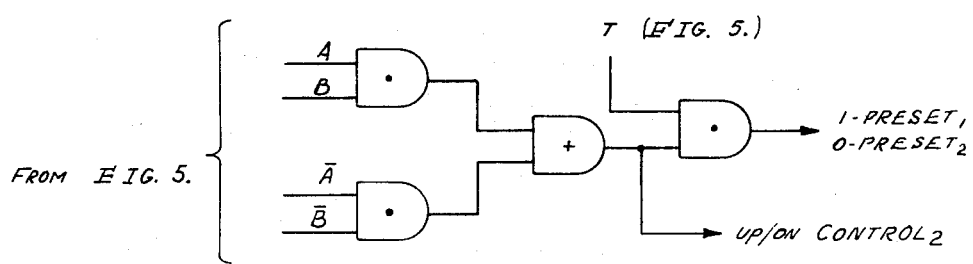
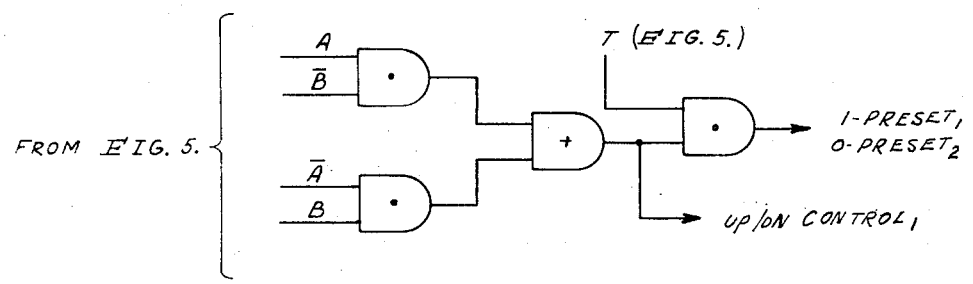
FIG. 10.

DIGITAL DIFFERENTIAL ANALYZER SPIRAL SCAN GENERATOR

The invention herein described was made in the course of or under a Contract or Subcontract thereunder with the Navy.

BACKGROUND OF THE INVENTION

This invention relates to a sweep generator for control of an object's position on an $X$-$Y$ coordinate system, such as the electron beam of a cathode ray tube as may be utilized with PPI displays, and particularly to a digital spiral sweep control system using digital differential analyzers (DDA's) for sonar PPI display.

Conventional spiral sweep generators developed for use with sonar display systems employ analog function generators driven by an azimuth (sinusoidal) scan signal. Other systems have been developed which employ analog and digital techniques. Such hybrid techniques avoid some of the cost and stability problems of an analog system, but do not provide the degree of accuracy that can be achieved by using digital techniques in computing the spiral sweep pulse trains under control synchronization of azimuth analog signals. For example, a cosine signal can be readily derived from a sinusoidal azimuth scan signal; the sine and cosine signals may then be employed to control digitally variable frequency generators. Digital pulse range rate multipliers may then be employed to generate pulse trains which vary in frequency as a function of not only the sine and cosine of sweep angle $\theta$ but also of range as the spiral scan sweep progresses outwardly from the center.

It would be very desirable to generate digital sweep pulse trains as a function of sweep angle and range for a spiral sweep generator that does not depend upon the stability of analog signal amplitudes but only depends upon an azimuth scan signal for synchronization at one or more cardinal points as the sinusoidal azimuth scan signal passes through successive cycles while the digital spiral sweep pulse trains are generated.

SUMMARY OF THE INVENTION

In accordance with the present invention, digital spiral sweep pulse trains $\Delta x$ and $\Delta y$ are generated for control of an object's position in an $X$-$Y$ coordinate system using a pair of cross-coupled DDA's to compute sine and cosine values in synchronism with a sinusoidal azimuth scan signal and DDA's coupled to the sine and cosine DDA's to compute absolute values of $X$ and $Y$ as trains of pulses representing increments $\Delta x$ and $\Delta y$ at frequencies proportional to respective values $|X|$ 27 and $|Y|$. Finite increments of sweep angle are applied by an oscillator to the cross-coupled DDA's synchronized by the azimuth scan signal while spiral sweep pulse trains are being generated for one full range cycle of the spiral sweep. One of the cross-coupled DDA's develops an integrand equal to $|\sin \theta|$ while the other develops an integrand equal to $|\cos \theta|$. Integrand counters in the respective cross-coupled DDA's are synchronized and controlled to count up and down by signals from a control logic network which detects the cardinal points of the azimuth scan signal. Each time a given integrand counter is caused to change the direction of counting, it is preset to the correct value for the current cardinal point to avoid the possibility of any cumulative error. At the same time, the accumulators of the cross-coupled DDA's are reset to a predetermined value which may be zero, but preferably set to half the maximum value that can be accumulated.

The desired $\Delta x$ and $\Delta y$ digital spiral sweep pulse trains are generated by four separate DDA's functioning as range rate multipliers. For the $\Delta x$ pulse train, one DDA provides range increments as a function of a variable integrand $R$ and, as iteration commands, increments $\Delta u$ of $\sin \theta$, and a second DDA also produces range increments as a function of the varying integrand $U$ and increments of range $\Delta r$ from a range oscillator. The range increments are then ORed to produce $\Delta x$ range quanta (increments). The increments $\Delta y$ are similarly produced by two DDA's, the outputs of which are ORed, one digital integrator providing the range increments $\Delta y$ as a function of the varying integrand $R$ and, as iteration commands, increments $\Delta v$ of $\cos \theta$ applied from one of the cross-coupled DDA's. The other digital integrator then forms increments $\Delta y$ as a function of the variable integrand $V$ and increments $\Delta u$. The values defining a spiral in an $X$-$Y$ coordinate system are then developed by separate accumulators for counting range increments $\Delta x$ and $\Delta y$. The accumulators are up-down counters which count in synchronization with the integrand counters of the cross-coupled DDA's. At the end of each spiral sweep generation cycle, the $X$ and $Y$ accumulators are reset to $X$-$Y$ coordinate values of the starting point for the next cycle, usually the origin of both axes of the coordinate system.

In applications where the radius or range changes slowly with respect to $\theta$ it is possible to reduce the number of digital integrators connected to the cross-coupled DDA's from four to two such that increments $\Delta x$ are generated as a function of the variable integrand $R$ and increments $\Delta u$ from the cross-coupled DDA's, and the increments $\Delta y$ are generated as a function of the variable integrand $R$ and the increments $\Delta v$ from the other of the two cross-coupled DDA's.

The novel features of the invention are set forth with particularity in the appended claims. The invention will best be understood from the following description when read in conjunction with the accompanying drawings.

DESCRIPTION OF THE DRAWINGS

FIG. 2 is a schematic diagram illustrating the organization of a spiral sweep generating system in accordance with the present invention.

FIG. 3 is a schematic diagram of a digital differential analyzer (DDA). A symbol indicated by a dotted line is employed to represent DDA's cross-coupled in the schematic diagram of FIG. 2.

FIG. 9 is a schematic diagram of a specific embodiment of the present invention for applications involving a slowly changing radius or range and FIG. 10 is a schematic logical circuit diagram for generating control and timing signals.

DESCRIPTION OF THE PREFERRED EMBODIMENTS

Figure 1:
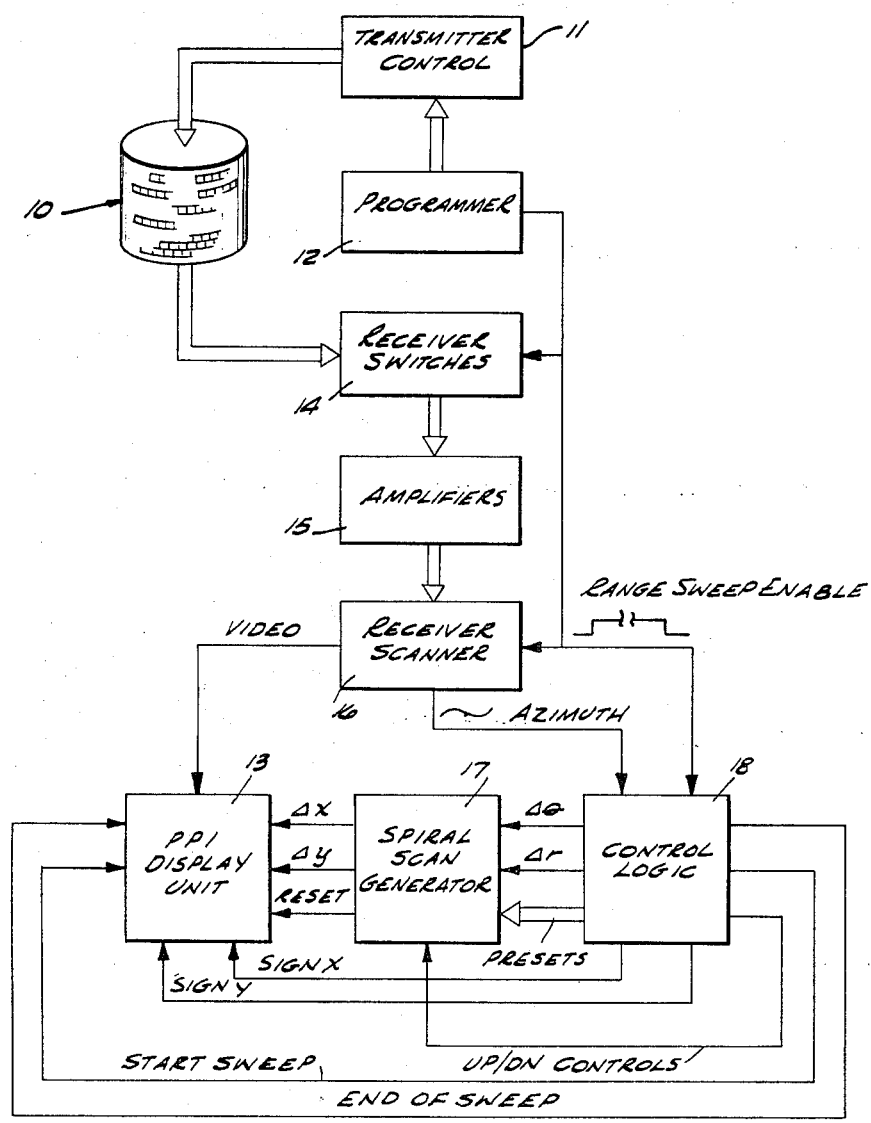
FIG. 1 is a functional block diagram of a sonar system including a spiral scan generating system as an illustrative application of the present invention.

Referring first to FIG. 1, a sonar system embodying the present invention includes an omnidirectional sound transducer 10 comprising a matrix of piezoelectric elements, such as barium titanate or lead titanate zirconate ceramic elements, effectively wrapped around a hollow cylinder to form what are commonly referred to as rows and staves of elements. A transmitter control 11 is programmed by an electronic programmer 12 to excite simultaneously all staves of rows so selected as to effectively form an omnidirectional beam of sound.

In a typical transducer, there are seven rows and 72 staves. Since a piezoelectric element will respond to pressure pulses to produce voltage pulses, the presence of targets may be detected by scanning the staves in sequence starting at an origin representing 0° relative bearing on a PPI display unit 13.

To sequentially scan the staves of the transducer 10, receiver switches 14 are enabled by a range sweep enable signal produced by the programmer 12 following a transmitted sound pulse. Amplifiers 15 couple signals from receiver switches to a receiver scanner which, for a PPI display, will cyclically sample the combined signals of all rows in successive staves. If a target is present at a given azimuth and range, as the receiver scanner 16 scans the stave oriented at that bearing (at a time after the sound pulse has been transmitted sufficient to allow an echo pulse to be received from that range), a video signal is produced and applied to the PPI display unit 13 as an intensity control signal to brighten the face of a cathode ray tube at an azimuth angle and distance from the center corresponding to the bearing and range of the target. That position on the PPI display is correlated with the actual position of the target through a spiral scan generator 17 which causes the electron beam of a cathode ray tube in the PPI display unit 13 to be positioned at points moving around the center of the display at a monotonically increasing distance from the center with the azimuth angle of a given position corresponding directly with the azimuth position of the receiver scanner 16 as it cyclically scans the staves of the transducer 10. That is accomplished in accordance with the present invention by a spiral scan generator which produces $\Delta x$ and $\Delta y$ digital spiral sweep pulse trains which are accumulated in the PPI display unit to provide $X$-$Y$ coordinates of successive positions of the electron beam on a spiral.

As will be described more fully hereinafter with reference to FIGS. 2 and 9, a pair of DDA's are cross-coupled to generate from increments $\Delta\theta$ the derivatives of the $|\sin|\theta$ and $|\cos\theta|$. The derivatives thus generated are then effectively multiplied by an ever increasing range by digital integrators to form the derivatives of $X$ and $Y$, where $X$ and $Y$ are equal to $R|\sin\theta|$ and $R|\cos\theta|$.

A control logic network 18 responds to the range sweep enable signal from the programmer 12 to generate the increments $\Delta\theta$ and $\Delta r$, to provide appropriate preset signals to integrand up-down counters and accumulators in the spiral scan generator 17, and to provide appropriate direction control to up-down counters. In addition, the control logic network 18 continually determines the signas signs of $X$ and $Y$ (FIG. 5) from a sinusoidal azimuth sweep signal transmitted by the receiver 16 to synchronize the PPI display 13 in azimuth with the scanning of staves in the transducer 10. Start sweep, and end-of-sweep signals may also be provided by the control logic 18, if required, by simply differentiating the leading and trailing edges of the range sweep enable signal. End of sweep signals may be provided by differentiating the trailing edge of the range sweep pulses by conventional differentiating circuit such as the circuit 56 of FIG. 2.

Although specific reference has thus far been made to only a sonar system having a spiral scan generator for PPI display, it should be noted that other systems may employ the system of FIG. 2 to equal advantage, such as a PPI display for a radar system, or even a numerical control tool director. For both sonar and radar applications, the range increases from zero to a maximum, at a slow rate for a sonar system, and at a fast rate for a radar system. Other applications of the present invention may have angle $\theta$, range, or radius, varying at some rate; the system of FIG. 2 is suitable for all these applications, including both radar and sonar. A simplified spiral scan generator can be utilized for applications where range, or radius, changes very slowly, such as in sonar, as will be described with reference to FIG. 9.

Referring now to FIG. 2, $\Delta x$ and $\Delta y$ digital spiral sweep pulse trains are generated by a first DDA 21 cross-coupled with a second DDA 22 to compute absolute values of $V$ and $U$ corresponding to $|\cos\theta|$ and $|\sin\theta|$. As $|\sin\theta|$ and $|\cos\theta|$ are being computed by the cross-coupled DDA's, the derivatives of $|\sin\theta|$ and $|\cos\theta|$ are also being produced in accordance with the following equations:

$$du = vd\theta = \cos\theta d\theta \tag{1}$$

$$dv = -vd\theta = -\sin\theta d\theta \tag{2}$$

where $d\theta$ represents increments of azimuth sweep. In practice, finite increments $\Delta\theta$, $\Delta u$, and $\Delta v$ are employed to implement Equations (1) and (2). The increments $\Delta u$ and $\Delta v$ are produced in the normal process of iterating the DDA's by increments $\Delta\theta$ while integrand counters in the respective DDA's 21 and 22 count the increments $\Delta u$ and $\Delta v$ to form the values $|V|$ and $|U|$. To accomplish that, the respective DDA's are synchronized and controlled to count up and down by the control logic network 18 (FIG. 1) which detects the cardinal point (0°90°, 180° and 270°) of the sinusoidal azimuth sweep signal in order that the signs of $\sin\theta$ and $\cos\theta$ will be synchronized with the receiver scanner 16.

Although the signs could be applied to the integrands $V$ and $U$ being generated by the cross-coupled DDA's 21 and 22, it is not necessary to do so as long as the integrand counters are properly controlled to count up from 0.000...0 up and to 0.111...1 and back down again changing direction at every cardinal point of the azimuth sweep signal. In the case of the integrand counter in the DDA 21, it counts up during the first and third quadrants of each cycle of the azimuth sweep signal, and down during the second and fourth quadrants. While integrand counter for $|\sin \theta|$ is counting up, the integrand counter for $|\cos \theta|$ must count down.

Cumulative errors in generating $|\sin \theta|$ and $|\cos \theta|$ can be avoided by presetting the integrand counters to their correct values at each of the four cardinal points during every azimuth sweep cycle. At the beginning of every first and third quadrant, the integrand counter in the DDA 22 is preset to zero while the integrand counter in the DDA 21 is effectively preset to one. During the second and fourth quadrants, the presets are interchanged.

Before proceeding with a more detailed description of the present invention illustrated in FIG. 2, the basic operation of a digital differential analyzer (DDA) will be described with reference to FIG. 3 which shows in a dotted line the basic components of the DDA 21 in FIG. 2. The form of the dotted line is used in FIGS. 2 and 9 to represent DDA's having identically the same basic components.

The basic components of the DDA 21 implement Equation (1). An up-down counter 24 contains the current value of the integrand $V$. By properly presetting the updown counter 24 at cardinal points of the azimuth sweep signal from the receiver scanner 16 (FIG. 1), and controlling the counting direction, the DDA 21 continually forms the value $V$ which is equal to $|\cos \theta|$.

An adder 25 continually adds the contents of the counter 24 and an accumulator 26 provides a sum, and an overflow increment when the sum exceeds the maximum value which can be stored in the accumulator 26. In practice, the up-down counter 24, adder 25 and accumulator 26 may each be provided with a capacity for any number, such as 11, digits of a binary number. Thus, for every increment $\Delta\theta$, the DDA 21 will store the sum from the adder 25 in the accumulator 26, and when necessary transmit an overflow increment as an increment $\Delta u$. That function is represented in FIG. 3 by AND gates 27 and 28. However, it should be appreciated that although the transmission of an increment $\Delta u$ in response to an increment $\Delta\theta$ can be readily implemented with a single AND gate, the function of storing the sum in the accumulator 26 must be accomplished by a separate AND gate similar to the AND gate 27 for each binary stage of the accumulator 26, if, for speed, a parallel adder and parallel transfer of the sum is desired.

The increments $\Delta u$ are counted by an up-down integrand counter in the DDA 22 to form the integrand $|U|$ which is equal to $|\sin \theta|$ in the same way the up-down counter 24 receives the increments $\Delta v$ to form the integrand $|V|$. In that manner, the DDA's 21 and 22 which are identical in organization are cross-coupled to generate absolute cosine and sine values, and increments $\Delta v$ and $\Delta u$ at rates proportional to those values. However, since the absolute value of $\sin \theta$ is decreasing from one to zero while the absolute value of $\cos \theta$ is increasing from zero to one, and vice versa, the presets and up-down controls for the integrand counters are independent as indicated by the subscript one for the preset and up-down control signals to the integrand counter in the DDA 21, and the subscript two for the corresponding control signals for th DDA 22.

The integrand counter 24 may be any conventional counter which may be controlled to count up in response to a given voltage level, such as +6 volts, and to count down in response to a second voltage level, such as 0 volts, but not count above 0.111...1 nor below 0.000...0. Such a limited counting range can be readily implemented by an input gate for increment pulses to be counted which is normally enabled and disabled by an AND gate which detects the count of 0.111...1 while the count direction is up, and disabled by an AND gate which detects the count of 0.000...0 while the count direction is down. Other known techniques could, of course, be used. Thus the up-down control may be simply a binary signal. For generating $\cos \theta$ in the counter 24, the up-down control signal is synchronized to cause the counter 24 to count up in the second and fourth quadrants and down in the first and third quadrants while the up-down control signal for the integrand counter in the DDA 22 is reversed to count up during the first and third quadrants, and down during the second and fourth quadrants.

The preset signals are also keyed to the cardinal points so that for the integrand counter in the DDA 21, a 0-PRESET$_1$ signal is generated to force every stage of the counter to zero at the cardinal points at which $\theta$ is equal to 90° and 270°. At the other cardinal points at which $\theta$ is equal to 0° and 180°, a 1-PRESET$_1$ signal is generated to force every stage of the counter 24 to a binary 1. Thus, in practice, the counter is set to zero when $|\cos \theta|$ is supposed to be zero and to a binary number which is just one increment short of the full value of $|\cos \theta|$ when it is supposed to be 1.000...0. This facilitates implementing the DDA without introducing any significant error. In other words, the 1-PRESET$_1$ signal sets the integrand counter 24 to substantially 1.000...0 by presetting it to 0.111...1. The integrand counter of the DDA 22 is similarly preset to zero and substantially one in accordance with the absolute value of $\sin \theta$ at cardinal points of 0°, 90°, 180° and 270°. To minimize error in the accumulators of the DDA's 21 and 22, upon presetting the integrand counters at each of the cardinal points, the accumulator of each DDA is preset to ½ by resetting to zero all stages of the accumulator except for the most significant bit, and setting the most significant bit position to a binary 1, thereby setting the accumulators to 0.100...0.

The cross-coupled DDA's 21 and 22 operate continuously in response to increments $\Delta\theta$ to generate absolute values of $\sin \theta$ and $\cos \theta$ as the respective integrands $U$ and $V$. The increments $\Delta\theta$ are generated by an azimuth oscillator and transmitted to the DDA's 21 and 22 during a range sweep enable signal. That may be readily accomplished by providing a stable oscillator operating at a frequency sufficiently high for the integrand counters to just reach counts corresponding to absolute values of $\sin \theta$ and $\cos \theta$ as they count up and down during half cycles of the azimuth sweep signal. The range sweep signal may then be employed to simply enable gates to transmit the increments $\Delta\theta$ to the DDA's 21 and 22.

Pulse trains for the $X$ and $Y$ coordinates are then generated as a function of the followingg digital differential equations:

$$\Delta x = R\Delta u + U\Delta r \tag{3}$$

$$\Delta y = R\Delta v + V\Delta r \tag{4}$$

The integrand $R$ for the first term of each equation is generated by a counter 30 which is reset to zero by the trailing edge of the range sweep enable signal from the programmer 12 and then counts increments $\Delta r$ generated by an oscillator in the control logic network 18 and gated to the counter 30 by the range sweep enable signal, just as $\theta$ pulses are gated to the DDA's 21 and 22.

Four separate DDA's 31 to 34 are employed to generate the four terms of Equations (3) and (4) using the content of the range counter 30 as the integrand $R$ for the DDA's 31 and 32 and the contents of the integrand counters of the DDA's 21 and 22 for the integrands $V$ and $U$ in the DDA's 33 and 34. The symbol employed for the DDA's 21 and 22 is not employed for the DDA's 31 to 34 in order to show that the DDA's 31 and 32 are sharing the integrand counter 30 to generate the first terms of Equations (3) and (4), and the DDA's 33 and 34 are sharing with the DDA's 21 and 22 the integrand counters of the DDA's 21 and 22 to generate the second terms of Equations (3) and (4).

The DDA 33 transmits increments $\Delta y_1$ in response to increments $\Delta r$ at a rate which varies with the integrand $V$ which is equal to $\cos\theta$ while the DDA 31 generates increments $\Delta y_2$ in response to increments $\Delta v$ at an ever increasing rate from the leading edge of the range sweep signal to the trailing edge for a complete spiral sweep cycle. The increments $\Delta y_1$ and $\Delta y_2$ are then added through an OR gate 35 to provide a train of pulses at a rate which is increasing with time for an increase in range or radius of the spiral sweep display. However, that ever increasing rate of increments $\Delta y$ is modulated by $\cos\theta$ not only because the integrand $V$ is employed by the DDA 33 but also because the increments $\Delta v$ applied to the DDA 31 occur at rates which are a function of the integrand $V$ in the DDA 21. The DDA's 32 and 34 similarly produce increments $\Delta x_1$ and $\Delta x_2$ which are added by an OR gate 36 to produce a train of increments $\Delta x$ at a rate which is basically increasing as a function of time for an ever increasing range or radius in the spiral sweep display but modulated by the integrand $U$ which is equal to $\sin\theta$.

Figure 4:
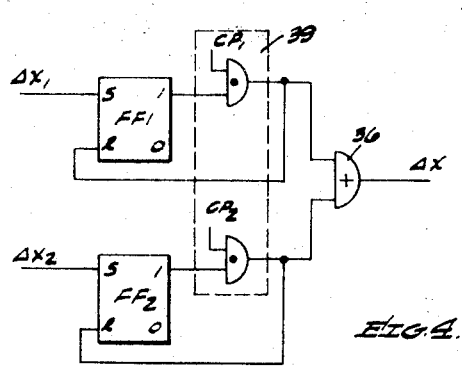
FIG. 4 is an anti-coincidence circuit which may be employed in the system of FIG. 3 to OR independent trains of pulses without loss of any pulses ORed.

It should be noted that any coincidence in the occurrence of increment pulses being ORed will result in the loss of one of them. In applications where such loss would be significant, the increment pulses may be applied to the OR gate through buffer flip-flops reset by out of phase clock pulses $CP_1$ and $CP_2$. Such an arrangement is illustrated in FIG. 4 for the increments $\Delta x_1$ and $\Delta x_2$. Flip-flops $FF_1$ and $FF_2$ are of the conventional R-S type, each adapted to be set and reset by the leading edges of applied pulses. In other words, each set and reset input circuit of a given flip-flop includes a differentiating network and a series diode in a conventional arrangement. Once set, the given flip-flop will enable a corresponding one of two AND gates 39 to transmit a clock pulse to the OR gate 36. The transmitted clock pulse will immediately reset the given flip-flop and increment pulses $\Delta x$ will be transmitted through the OR gate 36 out of phase (i.e., not in coincidence) in response to coincident increment pulses $\Delta x_1$ and $\Delta x_2$ so long as the clock pulses $CP_1$ and $CP_2$ applied to the two AND gates are controlled to be out of phase. That may be readily accomplished by generating clock pulses $CP_1$ at a frequency equal to or greater than the highest of the frequencies for the increments $\Delta\theta$ and $\Delta r$, and deriving the clock pulses $CP_2$ through a suitable delay line. For example, if the frequency of the clock pulses $CP_1$ is equal to the frequency of the increment pulses $\Delta\theta$, the duration of the clock pulses $CP_1$ may be set to one fourth the period of a full cycle for the increment pulses $\Delta\theta$. The delay line is then selected to produce a delay period equal to half the period of a full cycle for the increment pulses $\Delta\theta$. The maximum frequency at which increment pulses $\Delta x$ will then be transmitted by the OR gate 36 is twice the frequency of the clock pulses $CP_1$.

To generate derivatives $X$ and $Y$ for the coordinate system of the spiral sweep display, up-down counters 37 and 38 located in the PPI display unit 13 of FIG. 1 are connected to receive and count the respective increments $\Delta x$ and $\Delta y$. The values $X$ and $Y$ are, in general, ever increasing but are modulated to vary as a function of $|\cos\theta|$ and $|\sin\theta|$ respectively. That is accomplished by controlling the direction of the up-down counter 37 with the up-down control signal of the integrand counter in the DDA 22. The up-down counter 38 is similarly controlled by the up-down control signal which controls the integrand counter of the DDA 21. At the end of each spiral sweep generation cycle, the counters 37 and 38 are reset to zero as is the range counter 30. That may readily be accomplished by resetting all of those counters with the trailing edge of the range sweep signal from the programmer 12. Thus, by cross-coupling the two DDA's 22 and 21, derviatives of $|\sin\theta|$ and $|\cos\theta|$ are generated and applied to the DDA's 31 to 34 which then generate derivatives of $X$ and $Y$ for a spiral sweep scan in accordance with the foregoing equations (3) and (4).

In applications where range changes slowly with respect to azimuth ($\theta$), it is possible to reduce the foregoing equations to the following forms:

$$\Delta x = R\Delta u \tag{5}$$

$$\Delta y = R\Delta v \tag{6}$$

Figure 9:
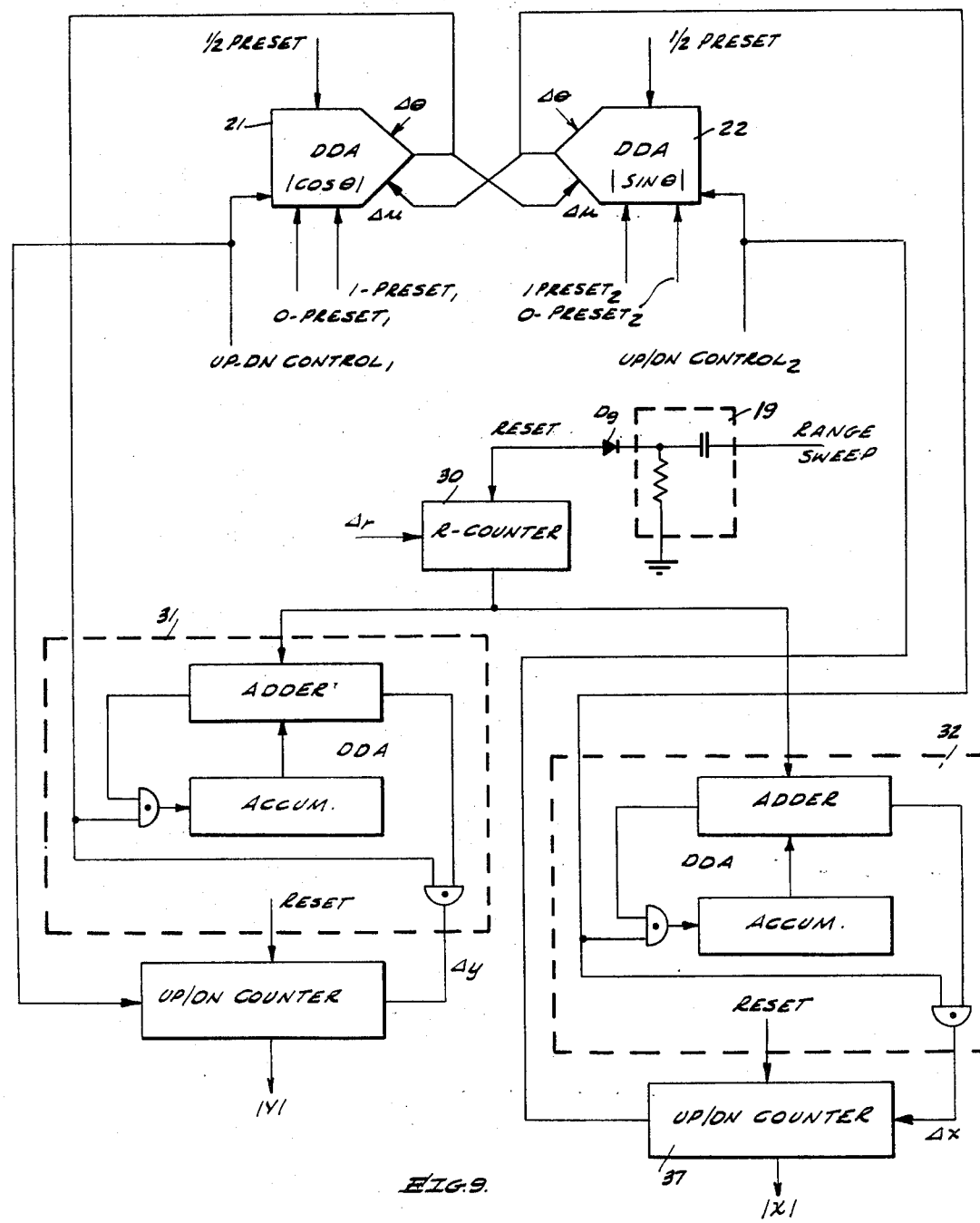

The derivatives $X$ and $Y$ are then generated with only the cross-coupled DDA's 21 and 22 and the range multiplying DDA's 31 and 32 as shown in FIG. 9. It should be noted that in either case the derivatives $X$ and $Y$ are absolute values since in these preferred embodiments, only absolute values of $\sin\theta$ and $\cos\theta$ are computed for use in computing $X$ and $Y$. The signs of $\sin\theta$ and $\cos\theta$ are derived independently of $X$ and $Y$ computations, and transmitted directly to the PPI display unit to simplify implementation of the DDA's.

Before proceeding with a detailed description of the second embodiment illustrated in FIG. 9, the manner in which the signs of $X$ and $Y$ are determined will now be described with reference to FIGS. 5 and 6. The sinusoidal azimuth sweep signal ($\sin\theta$) shown in FIG. 6 is applied to the control logic network 18 (FIG. 1) which includes the circuit of FIG. 5. A 90° phase shift network 40 is employed to derive a signal 90° out of phase with the sinusoidal azimuth signal as shown in FIG. 6. Thus, if the azimuth signal is employed to represent $\sin \theta$ for the spiral sweep display, the signal out of the phase shift network 40 will represent $\cos \theta$. When $\sin \theta$ is zero at 0°, $\cos \theta$ is +1. As $\sin \theta$ increases in the first quadrant, $\cos \theta$ decreases to zero. In the second quadrant $\sin \theta$ decreases to zero while $\cos \theta$ increases in magnitude but with a negative sign. In the third quadrant $\cos \theta$ decreases in absolute value to zero while $\sin \theta$ increases in absolute value but with a negative sign. Finally in the fourth quadrant, $\cos \theta$ increases to +1 while $\sin \theta$ decreases in magnitude to zero.

Figure 5:
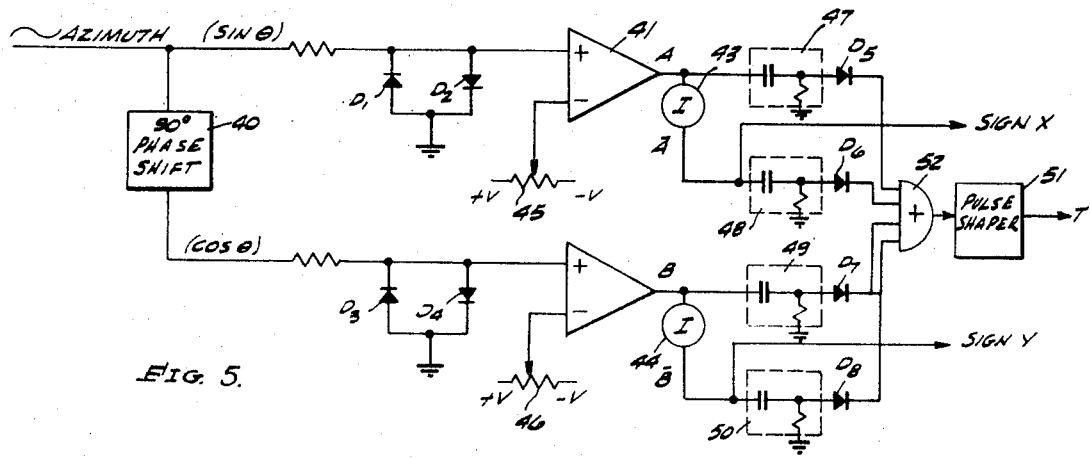
FIG. 5 is a circuit diagram illustrating the manner in which a sinusoidal azimuth synchronizing signal is employed to determine when the sinusoidal synchronizing signal reaches cardinal points, and also to determine the signs of $X$ and $Y$ derivatives developed by the present invention.
Figure 6:
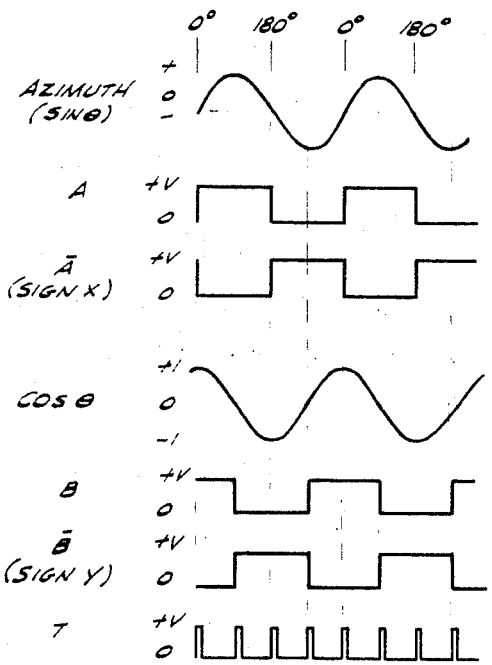
FIG. 6 is a timing diagram useful in understanding the operation of the circuit diagram of FIG. 5.

Differential comparators 41 and 42, which are essentially nothing more than high gain differential amplifiers, produce square wave signals A and B in the timing diagram of FIG. 5. Inverters 43 and 44 invert the signals A and B to provide signals $\bar{A}$ and $\bar{B}$. If the sign to be applied to the derivatives $X$ and $Y$ in the PPI display 13 (FIG. 1) is a binary 0 for a plus and a binary 1 for a minus sign, and a binary 0 is defined as a 0-volt level while a binary 1 is defined as a $+V$ level, it may be seen that the complementary signals $\bar{A}$ and $\bar{B}$ directly represent the signs of $\sin \theta$ and $\cos \theta$. Since the sign of $X$ corresponds to the sign of $\sin \theta$, and the sign of $Y$ corresponds to the sign of $\cos \theta$, the complementary signals $\bar{A}$ and $\bar{B}$ provide the required sign signals in binary form for direct use in the PPI display with the respective derviatives $X$ and $Y$.

It is important that leading and trailing edges of the square waves A and B correspond in time with the zero crossover or cardinal points of the sine and cosine waves. Accordingly, potentiometers 45 and 46 are provided to adjust the zero references for the differential comparators which, as just noted hereinbefore, are high gain differential amplifiers that quickly saturate when the input signals cross zero and become positive, and quickly cutoff when the input signals again cross zero. Hysteresis is reduced to substantially zero by the provision of high gain in the amplifiers. To protect such high gain amplifiers from excessively high input signals, limiting diodes $D_1$ and $D_4$ are provided. Still other techniques may be employed to produce square waves, including the use of a Schmitt trigger circuit which has been widely used in counting and pulse circuits since hysteresis may be made substantially zero by the proper choice of circuit parameters.

Differentiating networks 47 to 50 produce sharp positive and negative pulses at the leading and trailing edges of the square wave forms A, $\bar{A}$, B and $\bar{B}$. Diodes $D_5$ to $D_8$ then transmit only the sharp positive pulses to a pulse shaper 51 via an OR gate 52 to provide positive pulses (T) shown in FIG. 6 in time coincidence with the cardinal points of the sine and cosine waves. These cardinal pulses are then combined by the control logic network 18 to provide preset and up-down count control signals for the spiral scan generator 17 shown in FIG. 2 according to the following Boolean equations:

$1 - \text{PRESET}_1 = T(AB + \overline{AB})$
$0 - \text{PRESET}_1 = T(A\bar{B} + \bar{A}B)$
*UP/DN CONTROL$_1$ = $A\bar{B} + \bar{A}B$
$1 - \text{PRESET}_2 = T(A\bar{B} + \bar{A}B)$
$0 - \text{PRESET}_2 = T(AB + \overline{AB})$
*UP/DN CONTROL$_2$ = $AB + \overline{AB}$
$\frac{1}{2} - \text{PRESET} = T$

*True to count up, and false to count down.

These control signals are generated by a suitable logical mechanization in control logic unit 18 as shown by the conventional OR and AND gate arrangements of FIG. 10.

These control signals are applied to the integrand counters of the DDA's 21 and 22. The subscript 1 indicates a control signal for the DDA 21 and a subscript 2 indicates a control signal for the DDA 22. In addition, the accumulator of each of the DDA's 21 and 22 is preset to one-half (i.e., to 0.100 . . .0) at each cardinal point upon the occurance of a timing pulse $T$.

Although three separate Boolean equations are shown for each of the DDA's 21 and 22, it is apparent that the integrand counter of the DDA 21 is being preset to 1 (i.e., to 0.111 . . .1) while the integrand counter of the DDA 22 is being preset to zero (i.e., to 0.000 . . .0) and vice versa. Accordingly, in practice only two control signals are required which may be denominated $C_1$ and $C_2$ for the two preset conditions required for the integrand counters of the DDA's 21 and 22 since the same two control signals applied to the DDA 21 may be simply reversed for the control signals required for the integrand counter of the DDA 22. Regarding the up-down control of the integrand counters, since the integrand counter of the DDA 21 is to count up while the integrand counter of the DDA 22 is to count down, it is apparent that a single up-down control signal developed for the integrand counter of the DDA 21 may be employed for the integrand counter of the DDA 22 by simply inverting it.

Figure 7:
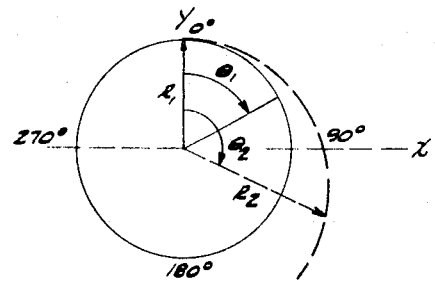
FIG. 7 is a diagram useful in understanding the operation of the system of FIG. 2.

FIG. 7 illustrates the orientation of the Cartesian coordinate axes $X$ and $Y$ for the PPI display 13 selected to provide a positive sign for the derivative $X$ as $\theta$ increases from 0° to 90° and 180° and a negative sign from 180° to 270° and back to 0°. The signal $\bar{A}$ may then be employed as the sign of $X$ directly as noted hereinbefore. Since the derivative $Y$ is then negative from 90° to 270° and positive the rest of the time, the signal $\bar{B}$ may then be used directly for the sign of $Y$.

FIG. 7 is also helpful in understanding the manner in which a spiral sweep is generated by the cross-coupled DDA's 21 and 22, and the DDA's 33 to 34. If the range or radius $R$ is maintained constant at a value $R_1$, the DDA's 21 and 22 define a circle. If the range $R$ is increased, the DDA's 31 to 34 then function essentially as rate multipliers to continually increase the rate at which the increments $\Delta x$ and $\Delta y$ are otherwise generated (i.e., to continually increase the derivatives $X$ and $Y$ as the radius is increased such as from the value $R_1$ to a value $R_2$).

Figure 8:
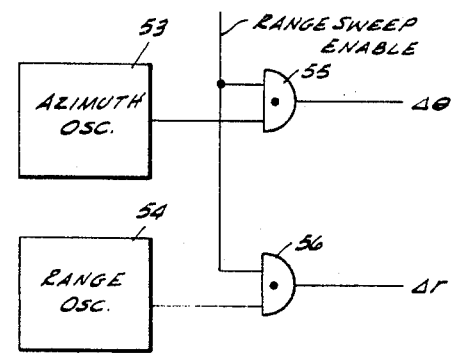
FIG. 8 illustrates the manner in which azimuth the range increments are produced for the system of FIG. 2.

The quanta increments of $\theta$ and range $R$ are generated clock pulses of independent stable oscillators 53 and 54 and gated through AND gates 55 and 56 by the range sweep enable signal as shown in FIG. 8 in the manner suggested hereinbefore. Other techniques may of course be employed, such as biasing the oscillators 53 and 54 on in response to the range sweep signal. In either case, increments $\Delta\theta$ are applied to the DDA's 21 and 22 at a constant rate during a complete spiral sweep cycle. At the same time, increments $\Delta r$ are applied to the range counter 30 and the derivative counters 37 and 38 for $X$ and $Y$ are reset as noted hereinbefore. That is readily accomplished by a differentiating network 56 and a diode $D_9$ poled to transmit only negative pulses derived from the trailing edge of the range sweep signal as shown in FIG. 2.

As noted hereinbefore, the spiral sweep generating system of FIG. 2 may be simplified for applications where range changes slowly with respect to azimuth, such as in a typical sonar system, by implementing Equations (5) and (6). That is illustrated in FIG. 9 wherein the cross-coupled DDA's 21 and 22 have their respective increments $\Delta u$ and $\Delta v$ applied to the DDA's 31 and 32. Increments $\Delta y$ and $\Delta x$ produced by the DDA's 31 and 32 are applied directly to the counters 37 and 38 located in the PPI display unit 13 of FIG. 1. The organization and operation of the simplified system is otherwise as described for the more complete system of FIG. 2.

Although particular embodiments of the invention have been described and illustrated herein, it is recognized that modifications and variations may readily occur to those skilled in the art. Consequently, it is intended that the claims be interpreted to cover such modifications and equivalents.

I claim:

1. A system for generating pulses representing increments $\Delta x$ and $\Delta y$ in digital pulse trains to be used for positioning an object along a spiral path in a rectangular Cartesian coordinate system comprising:

means for generating first and second clock pulses representing respective constant azimuth increments $\Delta \theta$ of said spiral path, and constant range increments $\Delta r$ of distance $R$ of said spiral path from the center of said coordinate system;

means responsive to said first clock pulses for generating values of sin $\theta$ and cos $\theta$, and for generating a first pulse train representing constant increments $\Delta u$ of successive changes in the value sin $\theta$ and a second pulse train representing constant increments $\Delta v$ of successive changes in the value cos $\theta$; including first and second cross-coupled digital differential analyzers wherein sin $\theta$ is developed as an integrand by a counter in said second analyzer in response to increments $\Delta u$ from said first analyzer, and cos $\theta$ is developed as an integrand by a counter in said first analyzer in response to increments $\Delta v$ from said second analyzer, and said increments $\Delta u$ and $\Delta v$ are produced in said first and second analyzers in response to said increments $\Delta \theta$;

means responsive to said second clock pulses for generating a continuously increasing value of said distance $R$; and means responsive to said value $R$ for varying the pulse rate of said first and second pulse trains as a function of said value $R$ to produce said trains of pulse increments $\Delta y$ and $\Delta x$, respectively.

2. A system as defined in claim 1 wherein said means for generating values of sin $\theta$ and cos $\theta$, and said first and second pulse trains comprises first and second cross-coupled digital differential analyzers wherein sin $\theta$ is developed as an integrand by a counter in said second analyzer in response to increments $\Delta u$ from said first analyzer, and cos $\theta$ is developed as an integrand by a counter in said first analyzer in response to increments $\Delta v$ from said second analyzer, and said increments $\Delta u$ and $\Delta v$ are produced in said first and second analyzers in response to said increments $\Delta \theta$.

3. A system as defined in claim 2 including third and fourth digital differential analyzers for producing third and fourth pulse trains as a function of respective integrands in said first and second analyzers and increments $\Delta r$ of said distance, and means for adding said third and fourth pulse trains to said first and second pulse trains, respectively, to produce said increments $\Delta y$ and $\Delta x$.

4. A system for generating pulses representing increments $\Delta x$ and $\Delta y$ as digital pulse trains for positioning an object along a spiral path in rectangular Cartesian coordinate system in synchronism with an azimuth sinusoidal signal representing sin $\theta$ as the distance of said spiral path from the center of said coordinate system varies comprising:

means for generating first and second clock pulses of independent frequencies representing respective increments $\Delta \theta$ of successive changes in azimuth of said spiral path and increments $\Delta r$ of successive changes in said distance;

means responsive to said first clock pulses for generating absolute sin $\theta$ and cos $\theta$ values, and a first pulse train representing changes in constant increments $\Delta u$ of sin $\theta$ and a second pulse train representing changes in constant increments $\Delta v$ of cos $\theta$;

means for counting said second clock pulses to generate a increasing varying value $R$ of said distance;

means responsive to said value $R$ for varying the pulse rate of said first and second pulse trains as a function of said value $R$ whereby the rate of said first and second pulse trains represent absolute values of sin $\theta$ and cos $\theta$; and means responsive to said sinusoidal signal for determining the signs of said absolute values of sin $\theta$ and cos $\theta$.

5. A system as defined in claim 4 including:

control means responsive to said sinusoidal signal for determining when said absolute values of sin $\theta$ and cos $\theta$ start increasing from 0 to substantially 1, and start decreasing from substantially 1 to 0;

a first up-down counter for counting said first pulse train up and down in response to said control means in synchronism with said absolute values of sin $\theta$ increasing and decreasing; and a second up-down counter for counting said second pulse train up and down in response to said control means in synchronism with said absolute values of cos $\theta$ increasing and decreasing.

6. A system as defined in claim 5 wherein said means for generating absolute values of sin $\theta$ and cos $\theta$, and said first and second pulse trains comprises first and second cross-coupled digital differential analyzers wherein sin $\theta$ is developed as an integrand by a counter in said second analyzer in response to increments $\Delta u$ from said first analyzer, and cos $\theta$ is developed as an integrand by a counter in said first analyzer in response to increments $\Delta v$ from said second analyzer, and said increments $\Delta v$ and $\Delta u$ are produced in said first and second counters in response to said increments $\Delta \theta$, and wherein said integrand counter for developing the absolute values of sin $\theta$ is set to zero when said control means determines the absolute value of sin $\theta$ is to start increasing, and to substantially one when said control means determines the absolute value of sin $\theta$ is to start decreasing, and said integrand counter for developing the absolute values of cos $\theta$ is set to zero when said control means determines the absolute value of sin $\theta$ is to start increasing, and to substantially one when said control means determines the absolute value of cos $\theta$ is to start decreasing.

7. A system as defined in claim 6 wherein each of said analzers includes a residual accumulator, and said accumulator is reset by said control means each time said integrand counters are caused to change counting direction.

8. The combination of claim 7 including third and fourth digital differential analyzers for producing third and fourth pulse trains as a function of respective integrands in said first and second analyzers and increments $\Delta r$ of said distance, and means for adding said third and fourth pulse trains to said first and second pulse trains, respectively, to produce said pulses representing increments $\Delta y$ and $\Delta x$.

9. Apparatus for generating digital spiral sweep pulse trains to permit PPI display in a sonar system using rectangular Cortesian coordinates $X$ and $Y$ comprising:
a source of azimuth clock pulses representing $d\theta$ in incremental form where $\theta$ is an azimuth angle;
a first pair of digital differential analyzers cross-coupled to form two integrators responsive to said clock pulses to form derivatives of $\sin \theta$ and $\cos \theta$ as respective pulse increments $\Delta u$ and $\Delta v$;
a source of range clock pulses representing $dr$ in incremental form, where the sum of clock pulses at any given time during a spiral sweep cycle represents range $R$;
a counter for adding said range clock pulses; and
a second pair of digital differential analyzers coupled to said first pair of digital differential analyzers, one digital differential analyzer of said second pair being responsive to derivatives of $\sin \theta$ and the numerical content of said range counter for forming derivatives of $X$, and the other of said digital differential analyzer of said second pair being responsive to derivatives of $\cos \theta$ and the numerical content of said range counter for forming derivatives of $Y$, said derivatives of $X$ and $Y$ being in the form of pulses representing increments $\Delta x$ and $\Delta y$.

10. Apparatus as defined in claim 9 wherein integrand counters of said first pair of digital differential analyzers form as integrands the absolute values of $\sin \theta$ and $\cos \theta$ in response to counting up and down said increments $\Delta u$ and $\Delta v$, respectively, and including:
a source of synchronizing sinusoidal azimuth sweep signal;
synchronizing means responsive to said sweep signal for determining when said sweep signal passes through cardinal points of 0°, 90°, 180° and 270°;
control means responsive to said sweep signal for causing said integrand counter for $|\sin \theta|$ to count up during first and third quadrants of said sweep signal cycle, and down during second and fourth quadrants of said sweep signal cycle, and for causing said integrand counter for $|\cos \theta|$ to count down during said first and third quadrants, and count up during said second and third quadrants; and
preset means responsive to said sweep signal for causing one of said integrand counters to be preset to zero at cardinal points where said control means initiates an upward counting operation for said one counter, and to preset the other said integrand counters to substantially one at the same time, and to preset the other of said counters to zero at cardinal points where said control means initiates an upward counting operation for said one counter, and to preset the one of said integrand counters to substantially zero at the same time.

11. Apparatus as defined in claim 10 including means responsive to said sweep signal for continually determining the signs of said integrands $|\sin \theta|$ and $|\cos \theta|$.

12. Apparatus as defined in claim 11 including a third pair of digital differential analyzers, one of said analyzers of said third pair being responsive to said integrand $|\sin \theta|$ and to said range clock pulses for forming derivatives of $X$, and the other of said analyzers of said fourth pair being responsive to said integrand $|\cos \theta|$ and to said range clock pulses for forming derivatives of $Y$, and means for adding respective derivatives of $X$ and $Y$ formed by said third and fourth pairs of analyzers.

13. A system for converting an azimuth sweep signal and a range sweep enable signal into digital pulse trains $\Delta x$ and $\Delta y$ for positioning an electron beam on a cathode ray tube for PPI display of video signals, the combination comprising:
a source of pulses representing increments $\Delta\theta$ of azimuth sweep angle gated on by said range sweep enable signal;
a source of pulses representing increments $\Delta r$ of range sweep gated on by said range sweep enable signal;
means comprising digital differential analyzers for computing absolute sine and cosine values of sweep angle $\theta$ as integrands and pulses representing increments $\Delta u$ and $\Delta v$ of $\sin \theta$ and $\cos \theta$, respectively, in response to said pulses representing increments $\Delta\theta$ in accordance with the following equations:
$\Delta u = |V|\Delta\theta$
$\Delta v = |U|\Delta\theta$
where $|V|$ is the absolute value of $\sin \theta$, and $|U|$ is the absolute value of $\cos \theta$;
means comprising digital differential analyzers for computing said pulse trains $\Delta x$ and $\Delta y$ in response to said pulses representing increments $\Delta r$ and said pulses representing increments $\Delta u$ and $\Delta v$ in accordance with the following equations:
$\Delta x_1 = R\Delta u$
$\Delta y_1 = Rdv$ where $x_1$ and $y_1$ are equal to $\Delta x$ and $\Delta y$, respectively, $R$ is an integrand value of range continuously determined by counting said pulses representing increments $\Delta r$ of range sweep from a preset value at the beginning of said range sweep enable signal.

14. A system as defined in claim 13 further comprising:
a pair of counters for counting up and down pulses of said trains $\Delta x_1$ and $\Delta y_1$ to form the absolute values of $X$ and $Y$;
means responsive to said azimuth sweep signal for controlling said pair of counters to count up said pulses of said train $\Delta x_1$, during said first and third quadrants of azimuth angle $\theta$, and to count down the balance of the time, and to count pulses of said train $\Delta y_1$ in a direction always opposite to counting said pulses of said train $\Delta y_1$.

15. A system as defined in claim 13 wherein said last named means further comprises digital differential analyzers for computing additional pulse trains $\Delta x_2$ and $\Delta y_2$ in response to said pulses representing increments $\Delta u$ and $\Delta v$ in accordance with the following equations:
$\Delta x_2 = |U|\Delta r$
$\Delta y_2 = |V|\Delta r$ and means for combining said pulse trains $\Delta x_1$ and $\Delta x_2$ into a single train $\Delta x$ equal to $\Delta x_1 + \Delta x_2$ and for combining said pulse trains $\Delta y_1$ and $\Delta y_2$ into a single train $\Delta y$ equal to $\Delta y_1 + \Delta y_2$.

16. A system as defined in claim 15 further comprising:
   a pair of counters for counting up and down pulses of said trains $\Delta x$ and $\Delta y$ to form the absolute values of $X$ and $Y$;
   means responsive to said azimuth sweep signal for controlling said pair of counters to count up said pulses of said train $\Delta x$, during said first and third quadrants of azimuth angle $\theta$, and to count down the balance of the time, and to count pulses of said train $\Delta y$ in a direction always opposite to counting said pulses of said train $\Delta y$.

* * * * *